United States Patent
Lee et al.

(10) Patent No.: US 6,807,817 B2
(45) Date of Patent: Oct. 26, 2004

(54) METHOD FOR OPERATING COMPRESSORS OF AIR CONDITIONER

(75) Inventors: Won Hee Lee, Seoul (KR); Cheol Min Kim, Kyunggi-do (KR); Yoon Jei Hwang, Seoul (KR); Ji Young Jang, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/638,315

(22) Filed: Aug. 12, 2003

(65) Prior Publication Data
US 2004/0107709 A1 Jun. 10, 2004

(30) Foreign Application Priority Data
Dec. 10, 2002 (KR) .................. 10-2002-0078325

(51) Int. Cl.[7] ................................................. F25B 7/00
(52) U.S. Cl. .................. 62/175; 62/228.5; 62/510; 417/7
(58) Field of Search ................ 62/175, 228.1, 62/228.3, 228.4, 228.5, 229, 510; 417/7

(56) References Cited

U.S. PATENT DOCUMENTS

| | | | | |
|---|---|---|---|---|
| 4,184,341 A | * | 1/1980 | Friedman | 62/175 |
| 4,612,776 A | * | 9/1986 | Alsenz | 62/175 |
| 4,614,089 A | * | 9/1986 | Dorsey | 62/158 |
| 4,628,700 A | * | 12/1986 | Alsenz | 62/152 |
| 4,679,404 A | * | 7/1987 | Alsenz | 62/175 |
| 4,951,475 A | * | 8/1990 | Alsenz | 62/117 |
| 5,050,397 A | * | 9/1991 | Sugiyama et al. | 62/175 |
| 5,067,326 A | * | 11/1991 | Alsenz | 62/193 |
| 2004/0016253 A1 | * | 1/2004 | Street et al. | 62/228.5 |

* cited by examiner

*Primary Examiner*—Marc Norman
(74) *Attorney, Agent, or Firm*—Greenblum & Bernstein, P.L.C.

(57) ABSTRACT

Disclosed is a method for operating a plurality of compressors of an air conditioner in accordance with a cooling or heating load in a room, in which a power supply unit for supplying power to the compressors is protected when a cooling or heating load in a room is the highest grade. The method comprises the steps of: (a) determining the cooling or heating load in the room; and (b) sequentially operating the plural compressors when it is determined as a result of the step (a) that the cooling or heating load in the room is in the highest grade.

21 Claims, 7 Drawing Sheets

METHOD FOR OPERATING COMPRESSORS OF AIR CONDITIONER

BACKGROUND OF THE INVENTION

1. Field of the Invention

The present invention relates to an air conditioner comprising a plurality of compressors, and more particularly to a method for operating compressors of an air conditioner in which the plural compressors are sequentially operated when a cooling or heating load in a room is in the highest grade.

2. Description of the Related Art

Generally, an air conditioner is an appliance for cooling or heating a room using a refrigerating cycle of a refrigerant compressed by compressors.

The compressor includes a compression unit provided with a compression chamber for compressing the refrigerant, and a motor unit for variably changing the capacity of the compression chamber. In order to meet a trend towards large scale and multi-function applications, the air conditioner has been developed to comprise two compressors or an inverter-type compressor so that the total operating capacity of the compressors can be variably changed in accordance with a cooling or heating load in a room, thereby reducing a power consumption rate required to operate the compressors.

Figure 1:
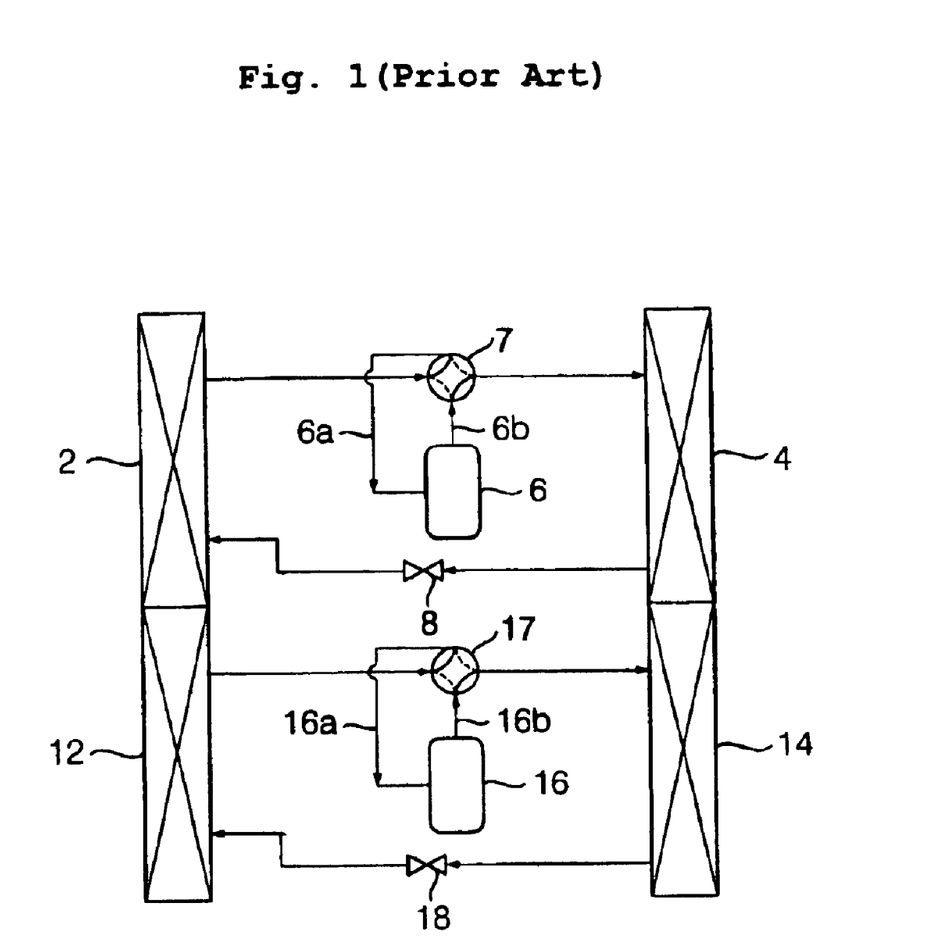
FIG. 1 is a schematic view of a conventional air conditioner provided with two compressors, which is operated in a cooling mode.
Figure 2:
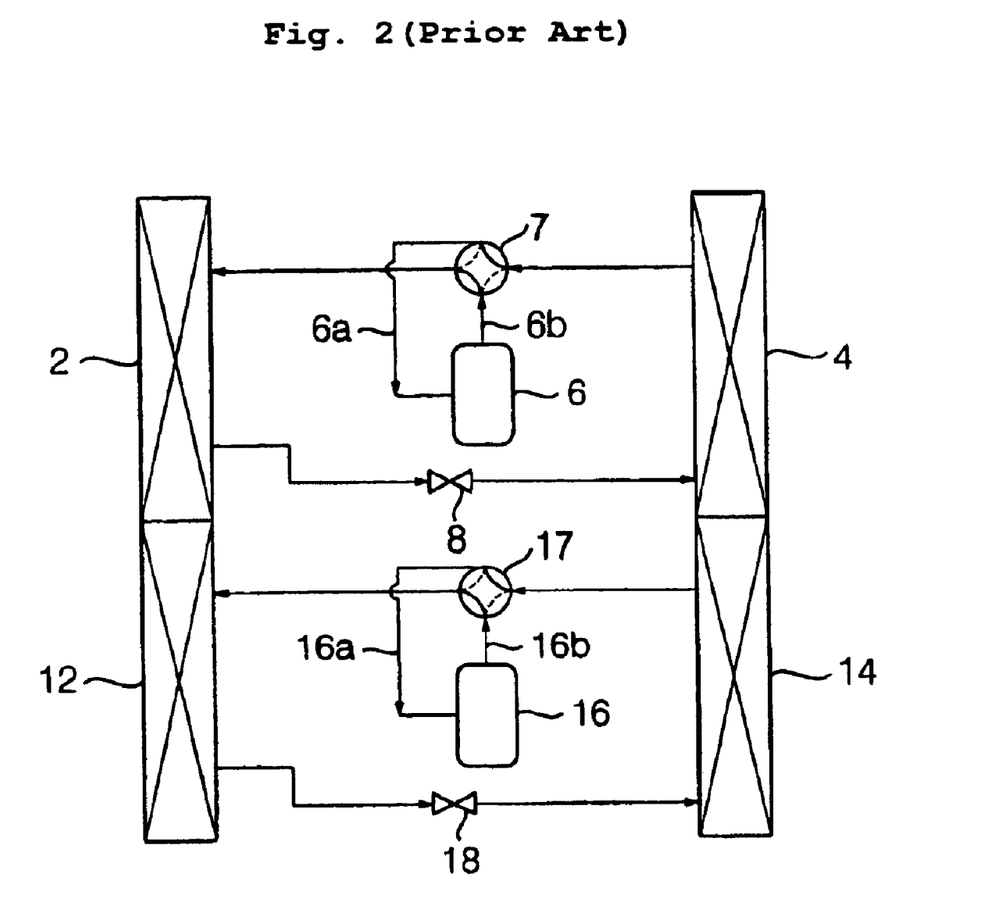
FIG. 2 is a schematic view of the conventional air conditioner provided with two compressors, which is operated in a heating mode.

FIG. 1 is a schematic view of a conventional air conditioner provided with two compressors, which is operated in a cooling mode. FIG. 2 is a schematic view of the conventional air conditioner provided with two compressors, which is operated in a heating mode.

As shown in FIGS. 1 and 2, the conventional air conditioner comprises first and second indoor heat exchangers 2 and 12 for heat-exchanging a refrigerant with air in a room, thereby cooling or heating the room, first and second outdoor heat exchangers 4 and 14 serving as condensers for condensing the refrigerant in case that the first and second indoor heat exchangers 2 and 12 function as coolers, while serving as evaporators for evaporating the refrigerant in case that the first and second indoor heat exchangers 2 and 12 function as heaters, first and second compressors 6 and 16 for compressing the refrigerant from a low-temperature and low-pressure gaseous state into a high-temperature and high-pressure gaseous state in order to supply the high-temperature and high-pressure gaseous refrigerant to the first and second indoor heat exchangers 2 and 12 or the first and second outdoor heat exchangers 4 and 14, a first expansion device 8 arranged between the first indoor heat exchanger 2 and the first outdoor heat exchanger 4 to expand the refrigerant into a low-temperature and low-pressure state, a second expansion device 18 arranged between the second indoor heat exchanger 12 and the second outdoor heat exchanger 14 to expand the refrigerant into a low-temperature and low-pressure state, and a control unit (not shown) for controlling operation of the first and second compressors 6 and 16. The first indoor heat exchanger 2, the first compressor 6, the first outdoor heat exchanger 4 and the first expansion device 8 are connected by a first refrigerant pipe 9, and the second indoor heat exchanger 12, the second compressor 16, the second outdoor heat exchanger 14 and the second expansion device 18 are connected by a second refrigerant pipe 19.

The reference numerals 7 and 17 respectively denote direction change valves adapted to change the flow direction of the refrigerant so that the air conditioner can be operated in a cooling or heating mode. The direction change valves 7 and 17 are respectively connected to suction lines 6a and 16a and discharge lines 6b and 16b of the first and second compressors 6 and 16, and controlled by the control unit so that the cooling and heating modes of the air conditioner are selectively established via a single refrigerating cycle of the refrigerant.

Now, the operation of the above-described conventional air conditioner provided with two compressors will be described in detail.

In case that the air conditioner is operated in a cooling mode and a cooling load in a room to be eliminated is large, as shown in FIG. 1, the control unit operates both of the first and second compressors 6 and 16, and a high-temperature and high-pressure refrigerant discharged from the first and second compressors 6 and 16 is transferred to the first and second outdoor heat exchangers 4 and 14. When the refrigerant passes through the first and second outdoor heat exchangers 4 and 14, the refrigerant is heat-exchanged with the peripheral air, thereby being condensed from a high-temperature and high-pressure gaseous state into a high-temperature and high-pressure liquid state. Then, the condensed refrigerant in the high-temperature and high-pressure liquid state is transferred to the first and second expansion devices 8 and 18. When the condensed refrigerant passes through the first and second expansion devices 8 and 18, the refrigerant is expanded into a low-temperature and low-pressure state and then introduced into the first and second indoor heat exchangers 2 and 12. When the expanded refrigerant passes through the first and second indoor heat exchangers 2 and 12, the refrigerant is heat-exchanged with air in the room, thereby absorbing heat and then being evaporated into a gaseous state. Here, the first and second indoor heat exchangers 2 and 12 function as coolers.

In case that the air conditioner is operated in the cooling mode and a cooling load in the room to be eliminated is small, the control unit operates only the first compressor 6. A refrigerant discharged from the first compressor 6 circulates along the first outdoor heat exchanger 4, the first expansion device 8, the first indoor heat exchanger 2 and the first compressor 6. Here, the first indoor heat exchanger 2 functions as a cooler.

On the other hand, in case that the air conditioner is operated in a heating mode and a heating load in the room to be eliminated is large, as shown in FIG. 2, the control unit operates both of the first and second compressors 6 and 16, and a high-temperature and high-pressure refrigerant discharged from the first and second compressors 6 and 16 circulates in the opposite direction of the circulation of the refrigerant in case that the air conditioner is operated in the cooling mode and the cooling load in the room to be eliminated is large. Here, the first and second indoor heat exchangers 2 and 12 function as heaters.

In case that the air conditioner is operated in the heating mode and a heating load in the room to be eliminated is small, the control unit operates only the first compressor 6. A refrigerant discharged from the first compressor 6 circulates along the first indoor heat exchanger 2, the first expansion device 8, the first outdoor heat exchanger 4 and the first compressor 6. Here, the first indoor heat exchanger 2 functions as a heater.

The conventional air conditioner comprising the first and second compressors 6 and 16 copes with only the amount of the cooling or heating load in the room. Since it is difficult for the conventional air conditioner to rapidly cope with the variation of the cooling or heating load, the conventional air conditioner has a limit in improving comfortableness in a room.

In order to rapidly cope with the variation of the cooling or heating load in the room and to improve comfortableness in the room, an air conditioner comprising four compressors has been proposed. In case that the four compressors are simultaneously operated, such an air conditioner comprising four compressors rapidly copes with the variation of the cooling or heating load in the room, thereby improving comfortableness in the room. However, in case that the four compressors are simultaneously operated, the total amount of excessive currents momentarily generated at the respective compressors exceeds the capacity of a power supply unit for supplying power to the four compressors, thus causing the power supply unit to be overloaded, overheated, and thus damaged.

SUMMARY OF THE INVENTION

Therefore, the present invention has been made in view of the above problems, and it is an object of the present invention to provide a method for operating compressors of an air conditioner, in which a power supply unit is protected when a cooling or heating load in a room is in the highest grade.

In accordance with one aspect of the present invention, the above and other objects can be accomplished by the provision of a method for operating a plurality of compressors of an air conditioner in accordance with a cooling or heating load in a room, comprising the steps of: (a) determining the cooling or heating load in the room; and (b) sequentially operating the plural compressors when it is determined as a result of the step (a) that the cooling or heating load in the room is in the highest grade.

In accordance with a further aspect of the present invention, there is provided a method for operating four compressors of an air conditioner in accordance with a cooling or heating load in a room, comprising the steps of: (a) determining the cooling or heating load in the room; and (b) sequentially operating the four compressors when it is determined as a result of the step (a) that the cooling or heating load in the room is in the highest grade.

In accordance with another aspect of the present invention, there is provided a method for operating first and second compressors respectively having a large capacity and third and fourth compressors respectively having a small capacity in accordance with a cooling or heating load in a room, comprising the steps of: (a) determining the cooling or heating load in the room; and (b) operating the first and second compressors simultaneously, and operating the third and fourth compressors simultaneously after a first set time from the beginning of the simultaneous operation of the first and second compressors, when it is determined as a result of the step (a) that the cooling or heating load in the room is in the highest grade.

In accordance with yet another aspect of the present invention, there is provided a method for operating first and second compressors respectively having a large capacity and third and fourth compressors respectively having a small capacity in accordance with a cooling or heating load in a room, comprising the steps of: (a) determining the cooling or heating load in the room; and (b) operating the first and third compressors simultaneously, and operating the second and fourth compressors simultaneously after a first set time from the beginning of the simultaneous operation of the first and third compressors, when it is determined as a result of the step (a) that the cooling or heating load in the room is in the highest grade.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 3:
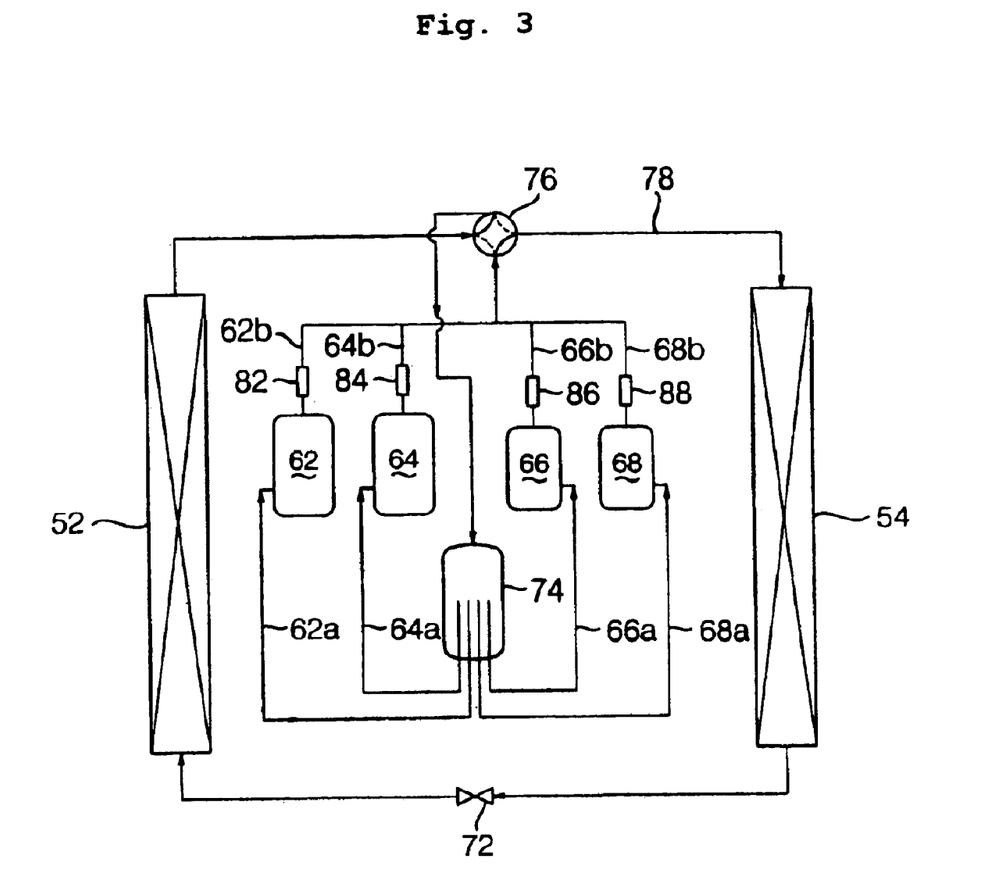
FIG. 3 is a schematic view of an air conditioner in a cooling mode in accordance with the present invention.
Figure 4:
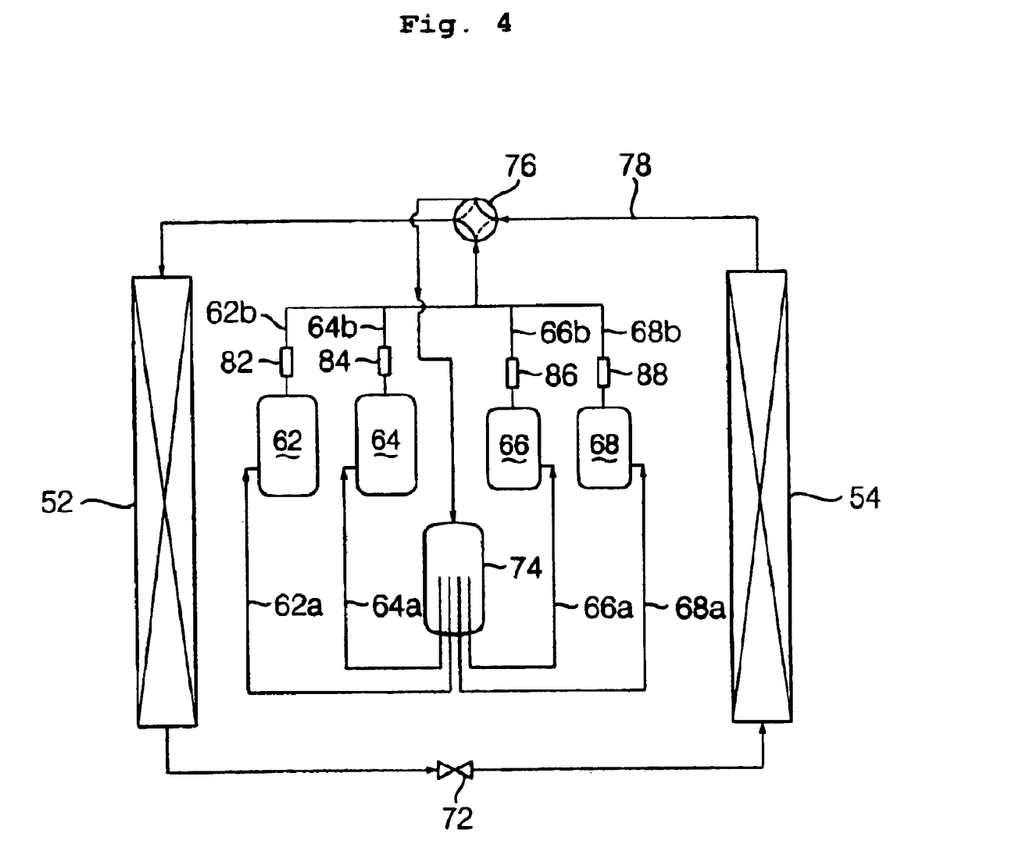
FIG. 4 is a schematic view of the air conditioner in a heating mode in accordance with the present invention.

FIG. 3 is a schematic view of an air conditioner in a cooling mode in accordance with the present invention, and FIG. 4 is a schematic view of the air conditioner in a heating mode in accordance with the present invention.

As shown in FIGS. 3 and 4, the air conditioner of the present invention comprises an indoor heat exchanger 52 for heat-exchanging a refrigerant with air in a room, thereby cooling or heating the room, an outdoor heat exchanger 54 for condensing the refrigerant in case that the indoor heat exchanger 52 functions as a cooler, while evaporating the refrigerant in case that the indoor heat exchanger 52 functions as a heater, a compression unit 60 including first and second compressors 62 and 64 respectively having a capacity of 30% and third and fourth compressors 66 and 68 respectively having a capacity of 20% for compressing the refrigerant, an expansion device 72 arranged between the indoor heat exchanger 52 and the outdoor heat exchanger 54 to expand the refrigerant into a low-temperature and low-pressure state, and a control unit (not shown) for controlling the first, second, third and fourth compressors 62, 64, 66 and 68 in accordance with a cooling or heating load in the room.

The indoor heat exchanger 52, the first, second, third and fourth compressors 62, 64, 66 and 68, the outdoor heat exchanger 54, and the expansion device 72 are connected by a refrigerant pipe 78.

The indoor heat exchanger 52 may include a plurality of unit indoor heat exchangers, and the refrigerant pipe 78 may be branched off into a plurality of pipes and connected to the plural unit indoor heat exchangers respectively.

The outdoor heat exchanger 54 may include a plurality of unit outdoor heat exchangers, and the refrigerant pipe 78 may be branched off into a plurality of pipes and connected to the plural unit outdoor heat exchangers respectively.

The first, second, third and fourth compressors 62, 64, 66 and 68 are connected in parallel, so that suction lines 62a, 64a, 66a and 68a thereof are combined and discharge lines 62b, 64b, 66b and 68b thereof are combined.

Preferably, the expansion device 72 is an electronic expansion valve, which can control an expansion degree of the refrigerant in response to a control signal of the control unit.

The reference numeral 74 denotes a common accumulator to which the suction lines 62a, 64a, 66a and 68a of the first, second, third and fourth compressors 62, 64, 66 and 68 are connected. The common accumulator 74 serves to store the refrigerant in a liquid state not evaporated by the indoor heat exchanger 52 or the outdoor heat exchanger 54, in order to prevent the liquid refrigerant from being introduced into the first, second, third and fourth compressors 62, 64, 66 and 68. Introduction of such a liquid refrigerant into the first, second, third and fourth compressors 62, 64, 66 and 68 may cause failure of the first, second, third and fourth compressors 62, 64, 66 and 68.

Also, the reference numeral 76 denotes a direction change valve, for example, a 4-way valve, adapted to change the flow direction of the refrigerant in response to the control signal from the control unit so that the air conditioner is used for a cooling or heating purpose. This 4-way valve 76 communicates with the common accumulator 74 and the discharge lines 62b, 64b, 66b and 68b of the first, second, third and fourth compressors 62, 64, 66 and 68. The 4-way valve 76 guides the high-temperature and high-pressure gaseous refrigerant compressed by the compression unit 60 to the outdoor heat exchanger 54 in a cooling mode, while it guides the same gaseous refrigerant to the indoor heat exchanger 52 in a heating mode.

The reference numerals 82, 84, 86 and 88 denote check valves respectively installed in the discharge lines 62b, 64b, 66b and 68b of the first, second, third and fourth compressors 62, 64, 66 and 68. The check valves 82, 84, 86 and 88 serve to prevent the refrigerant discharged from the currently-operating compressors, for example, the first and second compressors 62 and 64, from being introduced into the currently-stopped compressors, for example, the third and fourth compressors 66 and 68.

The first, second, third and fourth compressors 62, 64, 66 and 68 may be inverter-type compressors with a variable capacity, but preferably, are constant speed compressors with a simple structure and a low cost compared with the inverter-type compressor.

The control unit individually controls the first, second, third and fourth compressors 62, 64, 66 and 68 so that the total operating capacity of the compression unit 60 is one selected from 20%, 40%, 50%, 60%, 70%, 80% and 100%.

That is, the control unit operates the first, second, third and fourth compressors 62, 64, 66 and 68 by means of algorithm predetermined in accordance with a cooling or heating load in a room.

For example, in the cooling mode, the control unit determines the cooling load in the room to be one of four grades, i.e., the lowest/low/high/highest grades, and controls the operation of the first, second, third and fourth compressors 62, 64, 66 and 68 so that the total operating capacity of the compression unit 60 is one selected from 20%, 40%, 60% and 80% in accordance with the determined cooling load. When it is determined that the cooling load in the room is in the lowest grade, the control unit operates only one of the third and fourth compressors 66 and 68 so that the total operating capacity of the compression unit 60 is 20%. When it is determined that the cooling load in the room is in the low grade, the control unit operates both the third and fourth compressors 66 and 68 so that the total operating capacity of the compression unit 60 is 40%. When it is determined that the cooling load in the room is in the high grade, the control unit operates both the first and second compressors 62 and 64 so that the total operating capacity of the compression unit 60 is 60%. When it is determined that the cooling load in the room is in the highest grade, the control unit operates all of the first, second, third and fourth compressors 62, 64, 66 and 68 so that the total operating capacity of the compression unit 60 is 100%.

On the other hand, in the heating mode, the control unit determines the heating load in the room to be one of four grades, i.e., the lowest/low/high/highest grades, and controls the operation of the first, second, third and fourth compressors 62, 64, 66 and 68 so that the total operating capacity of the compression unit 60 is one selected from 50%, 70%, 80% and 100% in accordance with the determined heating load. When it is determined that the heating load in the room is in the lowest grade, the control unit operates one of the first and second compressors 62 and 64 and one of the third and fourth compressors 66 and 68 so that the total operating capacity of the compression unit 60 is 50%. When it is determined that the heating load in the room is in the low grade, the control unit operates one of the first and second compressors 62 and 64 and both the third and fourth compressors 66 and 68 so that the total operating capacity of the compression unit 60 is 70%. When it is determined that the heating load in the room is in the high grade, the control unit operates both the first and second compressors 62 and 64 and one of the third and fourth compressors 66 and 68 so that the total operating capacity of the compression unit 60 is 80%. When it is determined that the heating load in the room is in the highest grade, the control unit operates the first, second, third and fourth compressors 62, 64, 66 and 68 so that the total operating capacity of the compression unit 60 is 100%.

As described above, since the control unit individually controls the first, second, third and fourth compressors 62, 64, 66 and 68, the air conditioner rapidly copes with the cooling or heating load in the room. Further, in order to prevent a power supply unit from being damaged by the simultaneous operation of the first, second, third and fourth compressors 62, 64, 66 and 68, the control unit sequentially operates the first, second, third and fourth compressors 62, 64, 66 and 68.

Figure 5:
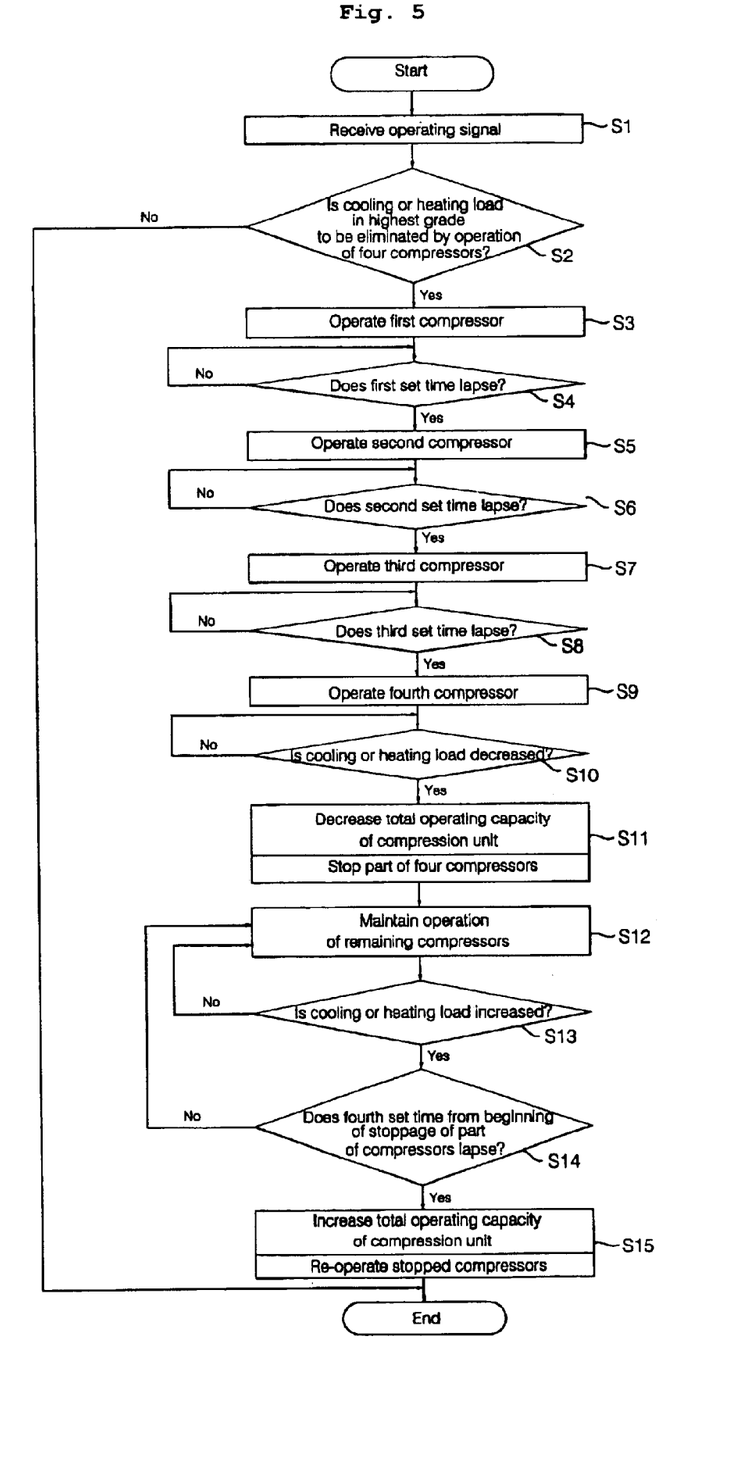
FIG. 5 is a flow chart illustrating a first embodiment of a method for operating compressors of an air conditioner in accordance with the present invention.

FIG. 5 is a flow chart illustrating a first embodiment of a method for operating compressors of an air conditioner in accordance with the present invention.

First, the control unit receives an operating signal from a user, and then determines a cooling or heating load in a room (S1 and S2).

When it is determined as a result of the step S2 that the cooling or heating load is in the highest grade to be eliminated by the total operating capacity of the compression unit 60 of 100%, the control unit operates all of the first, second, third and fourth compressors 62, 64, 66 and 68 so that the total operating capacity of the compression unit 60 is 100%. Here, the control unit sequentially operates the first, second, third and fourth compressors 62, 64, 66 and 68.

That is, the control unit first operates only one of the four compressors (for example, the first compressor 62) (S3).

Thereafter, after a first set time (for example, 0.3 seconds) from the beginning of the operation of the first compressor 62 lapses, the control unit operates another compressor (for example, the second compressor 64) (S4 and S5).

After a second set time (for example, 0.3 seconds) from the beginning of the operation of the second compressor 64 lapses, the control unit operates yet another compressor (for example, the third compressor 66) (S6 and S7).

After a third set time (for example, 0.3 seconds) from the beginning of the operation of the third compressor 66 lapses, the control unit operates the remaining compressor (for example, the fourth compressor 68) (S8 and S9).

That is, the first, second, third and fourth compressors 62, 64, 66 and 68 are sequentially operated at regular time intervals, thereby preventing the power supply unit from being damaged by excessive current momentarily generated by the individual operation of the first, second, third and fourth compressors 62, 64, 66 and 68.

Here, the first, second and third set times may be the same or different. Preferably, the first, second and third set times are determined in accordance with the amount of the excessive current supplied to the four compressors 62, 64, 66 and 68.

The first, second, third and fourth compressors 62, 64, 66 and 68, which were sequentially operated, are individually maintained in an on state and/or changed to an off state by control algorithm predetermined in accordance with the variation of the cooling or heating load.

That is, when the cooling or heating load in the room is decreased after the sequential operation of the first, second, third and fourth compressors 62, 64, 66 and 68, a part of the four compressors are stopped by means of the predetermined control algorithm so that the total operating capacity of the compression unit 60 copes with the decreased cooling or heating load (S10, S11 and S12).

For example, in case that the cooling or heating load in the room is decreased, the control unit stops one of the third and fourth compressors 66 and 68 so that the total operating capacity of the compression unit 60 is 80%. In case that the cooling or heating load in the room is more steeply decreased, the control unit stops one of the first and second compressors 62 and 64 and one of the third and fourth compressors 66 and 68 so that the total operating capacity of the compression unit 60 is 50%.

When the cooling or heating load in the room is again increased after the stoppage of the part of the first, second, third and fourth compressors 62, 64, 66 and 68, the control unit determines whether a fourth set time (for example, 10 seconds) from the beginning of the stoppage of the part of the compressors lapses. In case that it is determined that the fourth set time lapses, the control unit re-operates the stopped compressors (S13, S14 and S15).

For example, in case that the cooling or heating load in the room is again increased after the total operating capacity of the compression unit 60 is decreased to 80%, when the fourth set time from the stoppage of one of the third and fourth compressors 66 and 68 lapses, the control unit re-operates the stopped compressor so that the total operating capacity of the compression unit 60 is 100%. In case that the cooling or heating load in the room is more steeply increased again after the total operating capacity of the compression unit 60 is decreased to 50%, when the fourth set time from the stoppage of one of the first and second compressors 62 and 64 lapses and the fourth set time from the stoppage of one of the third and fourth compressors 66 and 68 lapses, the control unit re-operates the stopped compressors, for example, the stopped one of the first and second compressors 62 and 64 and the stopped one of the third and fourth compressors 66 and 68, so that the total operating capacity of the compression unit 60 is 100%.

When one of the first and second compressors 62 and 64 and one of the third and fourth compressors 66 and 68 are re-operated, the control unit does not operate them simultaneously, but preferably operates them sequentially. Further, preferably, the control unit operates one of the first and second compressors 62 and 64 and one of the third and fourth compressors 66 sequentially at a time interval of a fifth set time (for example, 0.3 seconds).

Although four compressors are sequentially operated one by one in this embodiment of the method for operating compressors of the air conditioner of the present invention, other manners are possible. That is, the first and second compressors 62 and 64 may be simultaneously operated, and then the third and fourth compressors 66 and 68 may be simultaneously operated after a first set time from the beginning of the simultaneous operation of the first and second compressors 62 and 64 lapses. Further, the first and third compressors 62 and 66 may be simultaneously operated, and then the second and fourth compressors 64 and 68 may be simultaneously operated after a first set time from the beginning of the simultaneous operation of the first and third compressors 62 and 66 lapses.

Here, the simultaneous operation of two compressors can be applied to the present invention, only when the power supply unit is not damaged by the total amount of excessive current momentarily generated by the individual operation of the compressors.

Figure 6:
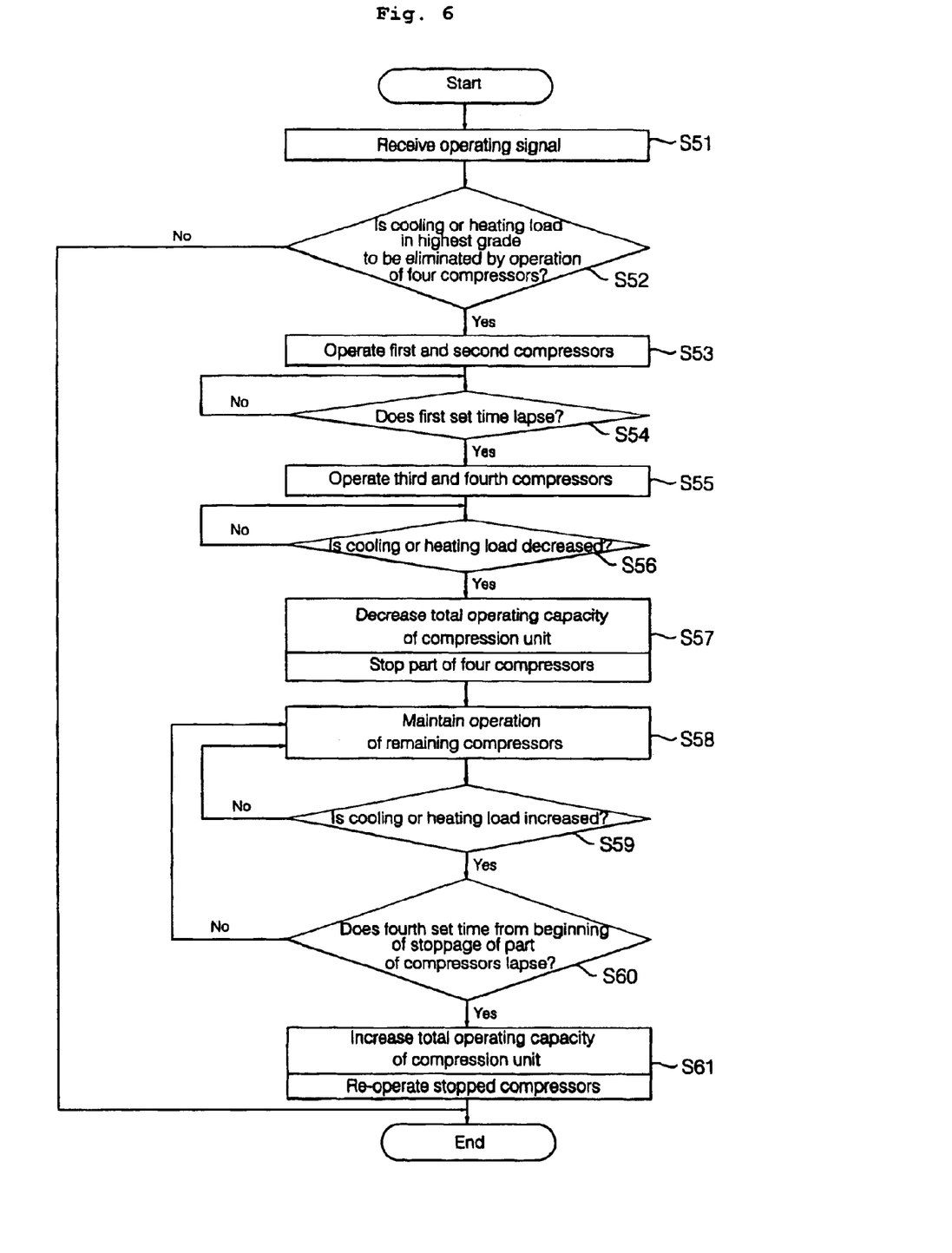
FIG. 6 is a flow chart illustrating a second embodiment of the method for operating compressors of an air conditioner in accordance with the present invention.

FIG. 6 is a flow chart illustrating a second embodiment of the method for operating compressors of an air conditioner in accordance with the present invention.

First, the control unit receives an operating signal from a user, and then determines a cooling or heating load in a room (S51 and S52).

When it is determined as a result of the step S52 that the cooling or heating load is in the highest grade to be eliminated by the total operating capacity of the compression unit 60 of 100%, the control unit first operates both the first and second compressors 62 and 64 respectively having a large capacity (S53).

After a first set time (for example, 0.3 seconds) from the beginning of the operation of the first and second compressors 62 and 64 lapses, the control unit operates both the third and fourth compressors 66 and 68 (S54 and S55).

That is, the total operating capacity of the compression unit 60 of the air conditioner is initially 60%, and then increased to 100% after the first set time lapses.

The operating first, second, third and fourth compressors 62, 64, 66 and 68 are individually maintained in an on state and/or changed to an off state by control algorithm predetermined in accordance with the variation of the cooling or heating load.

That is, when the cooling or heating load in the room is decreased after the operation of the first, second, third and fourth compressors 62, 64, 66 and 68, the control unit stops a part of the four operating compressors by means of the predetermined control algorithm so that the total operating capacity of the compression unit 60 copes with the decreased cooling or heating load (S56, S57 and S58).

Thereinafter, when the cooling or heating load in the room is increased after the stoppage of the part of the first, second, third and fourth compressors 62, 64, 66 and 68, the control unit determines whether a fourth set time (for example, 10 seconds) from the beginning of the stoppage of the part of the compressors lapses. In case that it is determined that the fourth set time lapses, the control unit re-operates the stopped compressors (S59, S60 and S61).

Here, the part of the four compressors are stopped and then re-operated after the second set time lapses, thereby preventing the power supply unit from being damaged by excessive current momentarily generated by the re-operation of the compressors the same as the initial operation of the compressors.

In case that the plural compressors are stopped and then re-operated, the control unit does not re-operate them simultaneously, but preferably re-operates them sequentially. Further, preferably, the stopped compressors are sequentially re-operated at a time interval of a third set time (for example, 0.3 seconds).

Figure 7:
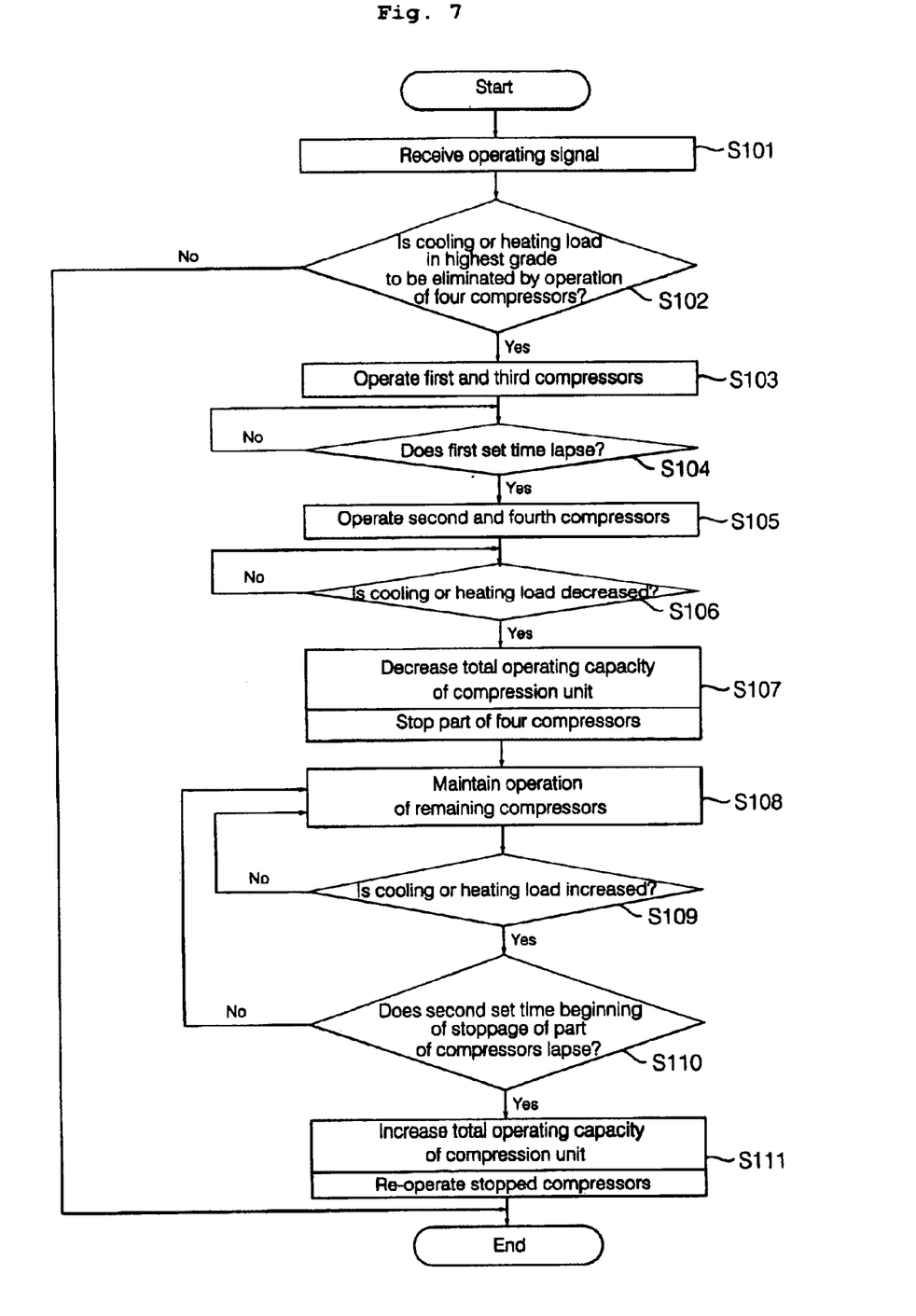
FIG. 7 is a flow chart illustrating a third embodiment of the method for operating compressors of an air conditioning in accordance with the present invention.

FIG. 7 is a flow chart illustrating a third embodiment of the method for operating compressors of an air conditioning in accordance with the present invention.

First, the control unit receives an operating signal from a user, and then determines a cooling or heating load in a room (S101 and S102).

When it is determined as a result of the step S102 that the cooling or heating load is in the highest grade to be eliminated by the total operating capacity of the compression unit 60 of 100%, the control unit first operates the first compressor 62 having a large capacity and the third compressor 66 having a small capacity (S103).

After a first set time (for example, 0.3 seconds) from beginning of the operation of the first and third compressors 62 and 66 lapses, the control unit operates the second compressor 64 having a large capacity and the fourth compressor 68 having a small capacity (S104 and S105).

That is, the total operating capacity of the compression unit 60 of the air conditioner is initially 50%, and then increased to 100% after the first set time lapses.

The operating first, second, third and fourth compressors 62, 64, 66 and 68 are individually maintained in an on state and/or changed to an off state by control algorithm predetermined in accordance with the variation of the cooling or heating load.

That is, when the cooling or heating load in the room is decreased after the operation of the first, second, third and fourth compressors 62, 64, 66 and 68, the control unit stops a part of the four operating compressors by means of the predetermined control algorithm so that the total operating capacity of the compression unit 60 copes with the decreased cooling or heating load (S106, S107 and S108).

Thereinafter, when the cooling or heating load in the room is increased after the stoppage of the part of the first, second, third and fourth compressors 62, 64, 66 and 68, the control unit determines whether a second set time from the beginning of the stoppage of the part of the compressors (for example, 10 seconds) lapses. In case that it is determined that the fourth set time lapses, the control unit re-operates the stopped compressors (S109, S110 and S111).

Here, the part of the four compressors are stopped and then re-operated after the second set time lapses, thereby preventing the power supply unit from being damaged by excessive current momentarily generated by the re-operation of the compressors the same as the initial operation of the compressors.

In case that the plural compressors are stopped and then re-operated, the control unit does not re-operate them simultaneously, but preferably re-operates them sequentially. Further, preferably, the stopped compressors are sequentially re-operated at a time interval of a third set time (for example, 0.3 seconds).

The method for operating the compressors of the air conditioner in accordance with the present invention has several advantages, as follows.

First, a control unit determines a cooling or heating load in a room, and does not operate the plural compressors simultaneously but operates the plural compressors sequentially, when it is determined that the cooling or heating load in the room is in the highest grade, thus preventing a power supply unit from being damaged due to the simultaneous operation of the plural compressors.

Second, the control unit operates the first compressor, the second compressor after a first set time from the beginning of the operation of the first compressor lapses, the third compressor after a second set time from the beginning of the operation of the second compressor lapses, and the fourth compressor after a third set time from the beginning of the operation of the third compressor lapses, thus allowing excessive current to be supplied to the compressors at time intervals and preventing the power supply unit from overheating.

Third, the control unit stops a part of the operating compressors when the cooling or heating load is decreased after the sequential operation of the compressors, thus allowing an air conditioner using this method to rapidly cope with the decreased cooling or heating load in the room, reducing a power consumption rate of the air conditioner, and increasing the life span of the compressors.

Fourth, the control unit re-operates the stopped compressors after a fourth set time from the beginning of the stoppage of the part of the operating compressors when it is determined that the cooling or heating load is again increased after the stoppages of the part of the compressors, thereby preventing the power supply unit from being damaged due to sudden re-operation of the compressors.

Fifth, compared with the method in which four compressors are sequentially operated, another method in which two compressors are first operated, and then the remaining two compressors are operated, is applied. Such a method is advantageous in that an air conditioner using this method more rapidly copes with the variation of the cooling or heating load.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of operating a plurality of compressors of an air conditioner in accordance with one of a cooling or heating load in a room, the method comprising:
   (a) determining a grade of one of the cooling or heating load in the room; and
   (b) sequentially starting the plurality of compressors when it is determined that one of the cooling or heating load in the room is the highest grade.

2. The method according to claim 1, wherein each of the plurality of compressors is sequentially started after an equivalent time interval.

3. The method according to claim 1, wherein each of the plurality of compressors is sequentially started after different time intervals.

4. A method of operating four compressors of an air conditioner in accordance with one of a cooling or heating load in a room, the method comprising:

determining a grade of one of the cooling or heating load in the room; and sequentially commencing operating the four compressors when it is determined that one of the cooling or heating load in the room is the highest grade.

5. The method according to claim 4, further comprising:

commencing operating a first compressor of the four compressors;

commencing operating a second compressor, of the four compressors, after a first set time interval from the beginning of the operation of the first compressor;

commencing operating a third compressor, of the four compressors, after a second set time interval from the beginning of the operation of the second compressor; and commencing operating a fourth compressor, of the four compressors, after a third set time interval from the beginning of the operation of the third compressor.

6. The method according to claim 5, wherein the first, second and third set time intervals are the same.

7. The method according to claim 5, wherein the first, second and third set time intervals are different.

8. The method according to claim 5, further comprising stopping at least one of the four operating compressors when one of the cooling or heating load is decreased.

9. The method according to claim 8, further comprising:

restarting the at least one stopped compressor after a fourth set time from the beginning of the stoppage of the at least one of the four operating compressors when it is determined that one of the cooling or heating load is again the highest grade.

10. The method according to claim 9, wherein the restarting includes sequentially restarting the stopped compressors when plural compressors are stopped.

11. The method according to claim 10, wherein the restarting includes sequentially restarting the stopped compressors at a fifth set time interval.

12. A method of operating first and second compressors respectively having a large capacity and third and fourth compressors respectively having a small capacity in accordance with one of a cooling or heating load in a room, the method comprising:

determining the cooling or heating load in the room; and commencing operating the first and second compressors simultaneously, and commencing operating the third and fourth compressors simultaneously after a first set time interval from a beginning of the simultaneous operation of the first and second compressors, when it is determined that one of the cooling or heating load in the room is the highest grade.

13. The method according to claim 12, further comprising stopping at least one of the four operating compressors when one of the cooling or heating load is decreased.

14. The method according to claim 12, further comprising:

restarting at least one of the stopped compressors after a second set time interval from a beginning of the stoppage of the at least one of the operating four compressors when it is determined that one of the cooling or heating load is again the highest grade.

15. The method according to claim 14, wherein the restarting includes sequentially restarting the stopped compressors when plural compressors are stopped.

16. The method according to claim 15, wherein the restarting includes sequentially restarting the stopped compressors at a third set time interval.

17. A method of operating first and second compressors respectively having a large capacity, and third and fourth compressors respectively having a small capacity in accordance with one of a cooling or heating load in a room, the method comprising:

determining one of the cooling or heating load in the room; and commencing operating the first and third compressors simultaneously, and commencing operating the second and fourth compressors simultaneously after a first set time interval after a beginning of the simultaneous operation of the first and third compressors, when it is determined that one of the cooling or heating load in the room is the highest grade.

18. The method according to claim 17, further comprising stopping at least one of the operating four compressors when one of the cooling or heating load is decreased.

19. The method according to claim 18, further comprising:

restarting at least one of the stopped compressors after a second set time interval from a beginning of the stoppage of the at least one operating four compressors when it is determined that one of the cooling or heating load is again the highest grade.

20. The method according to claim 19, wherein the restarting includes sequentially restarting the stopped compressors when the plural compressors are stopped.

21. The method according to claim 20, wherein the restarting includes sequentially restarting the stopped compressors at a third set time interval.

* * * * *